3,387,048
**PROCESS FOR THE SELECTIVE HYDROGENA-
TION OF BIPHENYL AND DIPYRIDYL AND
DERIVATIVES THEREOF**
Paul N. Rylander and Duane R. Steele, Newark, N.J.,
assignors to Engelhard Industries, Inc., Newark, N.J.,
a corporation of Delaware
No Drawing. Filed Oct. 28, 1964, Ser. No. 407,218
5 Claims. (Cl. 260—667)

This invention relates to the selective hydrogenation of bicyclic aromatic compounds having adjacent non-fused rings, and more especially to a process for the selective hydrogenation of biphenyl, dipyridyl and certain derivatives thereof wherein the selectivity resides in the predominant hydrogenative saturation of one aromatic ring only of the bicyclic aromatic compound.

Phenylcyclohexane is a compound of commercial importance and has principal utility as a solvent and plasticizer in the plastics, coatings and adhesive fields. It also is utilized as a penetrating agent. The high boiling point of phenylcyclohexane, i.e. ca. 237° C., together with a freezing point well below normal or room temperature, render the compound highly suited for the purposes stated. Pyridylpiperidines are commercially useful as insecticides.

In accordance with the present invention, a new and valuable process is provided for the selective or substantially selective hydrogenation of one aromatic ring only of a bicyclic aromatic compound selected from those having the formula

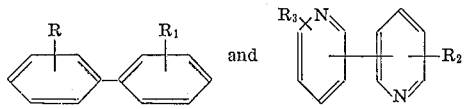

wherein R, $R_1$, $R_2$ and $R_3$ each are a hydrogen atom or a straight or branched chain lower alkyl radical, i.e. 1–4 C. alkyl. The process involves subjecting the selected bicyclic aromatic compound while in solution in an organic liquid solvent which favors the selective hydrogenation of one aromatic ring only of the compound as hereinafter defined, to reaction with molecular hydrogen in the presence of a palladium catalyst at a reaction temperature and pressure until sufficient hydrogen is taken up to saturate one ring of the compound. The reaction product thereby obtained comprises predominantly or principally the corresponding partially hydrogenated compound from the group consisting of those having the formula

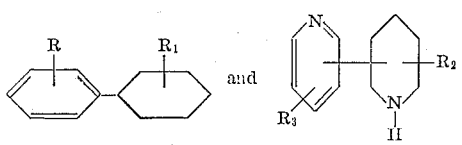

wherein R, $R_1$, $R_2$ and $R_3$ have the meaning aforesaid. Good yields of the selectively saturated compounds were obtained by the present process with especially high yields being attained of the commercially important phenylcyclohexane.

The selective hydrogenation of this invention is achieved by the essential combination of (1) the palladium catalyst, and (2) the organic liquid solvent favoring or being conducive to the hydrogenation of one aromatic ring only of the particular bicyclic aromatic compound to be hydrogenated.

Exemplary of the organic liquid solvents suitable for use herein by reason of favoring or being conducive to the hydrogenation of one aromatic ring only of the bicyclic aromatic compound are straight or branched chain saturated aliphatic hydrocarbon monocarboxylic acids having from 2–10 carbon atoms per molecule, e.g. acetic acid, propionic acid, n-butyric acid, isobutyric acid, n-caproic acid, n-valeric acid, n-heptoic acid, caprylic acid, capric acid and n-nonylic acid; and normally liquid straight or branched chain or cyclic paraffinic hydrocarbons having from 5–12 carbon atoms per molecule, e.g. cyclohexane, methylcyclohexane, n-pentane, isopentane, heptane, n-hexane, n-octane, isooctane, n-decane, nonane, cyclopentane, methylcyclopentane, n-decane, isodecane, 3-methylpentane, undecane, n-dodecane, cycloheptane, cyclooctane and cyclononane. Cyclohexane and acetic acid are the preferred solvents. It was unexpected and surprising that the combination of the palladium catalyst and organic liquid solvent of this invention attained good results in the selective hydrogenation of this invention inasmuch as when rhodium and ruthenium were utilized separately as catalyst with such organic liquid solvent, the hydrogenation of the bicyclic aromatic compounds herein took place non-selectively to produce considerable quantities of product having both aromatic rings saturated. Further when organic compounds such as cyclohexylamine, isopropanol, triethylamine or butyl alcohol are employed as solvent for the particular bicyclic aromatic in the presence of palladium as catalyst, either no hydrogenation occurs or the hydrogenation takes place at such a slow rate as to be unsatisfactory. While the selective hydrogenation takes place at a satisfactorily rapid rate with the solvents of this invention, the addition of a minor amount of water to the solvent either prior to or after admixing with the bicyclic aromatic compound to be hydrogenated is advantageous as an appreciable increase in the hydrogenation rate is thereby obtained. The amount of water advantageously added is typically 5–20% by weight, based on the weight of the organic liquid diluent. The organic liquid solvent of this invention is characterized by being inert with respect to the hydrogenation as well as normally liquid. Accordingly the term "organic liquid solvent which favors hydrogenative saturation of one aromatic ring only of the compound," i.e. the particular bicyclic aromatic compound to be hydrogenated, is used herein to mean or designate a certain normally liquid organic solvent, for instance one of the organic liquid solvents previously disclosed herein, which when utilized as a solvent for the particular bicyclic aromatic compound to be hydrogenated in the presence of the palladium catalyst, results predominantly or principally in one aromatic ring only of the bicyclic compound being saturated by taking up 3 moles of hydrogen.

Compounds that can be hydrogenated in accordance with the invention are, for example, biphenyl, 4,4'-dimethylbiphenyl, 3,4'-dimethylbiphenyl, 2-methyl-4'-ethylbiphenyl, 3-methylbiphenyl, 4-ethylbiphenyl, 4-butylbiphenyl, 2,2'-dibutylbiphenyl, 4,4'-diisopropylbiphenyl, 3,3'-t-butylbiphenyl, α,α-dipyridyl, β,β-dipyridyl, γ,γ-dipyridyl, α,β'-dipyridyl, α,γ'-dipyridyl, β,γ'-dipyridyl, β-methyl-α,α'-dipyridyl and β,β'-dimethyl-α,α'-dipyridyl.

The palladium catalyst is preferably supported on a solid catalyst carrier, for instance carbon, alumina, kieselguhr, barium sulfate or silica. The supported Pd catalyst may be prepared by immersing or otherwise treating the carrier particles, which may be spheres, granules, extrudates, etc. in an aqueous solution of a water-soluble compound of palladium, for instance palladium chloride, followed by reducing the compound on the support to metal. Less preferably the palladium catalyst may be unsupported. The Pd metal is usually present in the supported catalyst in amount, by weight, from about 0.1%–10%, preferably about 1%–5% (based on total supported catalyst.)

The hydrogenation reaction of this invention is carried out at a temperature preferably in the range from about 50° C.–300° C., more preferably from about 100° C.–200° C.; and a pressure in the range preferably from about 50–5,000 p.s.i.g., more preferably from about 1,000–2,000 p.s.i.g. A pressure sufficient to maintain the liquid phase is preferably employed when relatively high reaction temperatures are employed.

In carrying out the hydrogenating, a hydrogen-containing gas, for instance $H_2$ per se, is passed into the liquid mass of bicyclic aromatic compound in solution in the organic liquid solvent and containing the solid supported catalyst particles therein in a suitable reactor until sufficient hydrogen is taken up, i.e., reacted, to saturate one aromatic ring of the bicyclic aromatic. The reaction time for saturating one ring of the bicyclic aromatic in accordance with this invention is typically about 15–300 minutes, such time varying with different reaction conditions of temperature and pressure. With higher pressures and higher temperatures, the reaction time is in general less than with lower pressures and temperatures. The desired product bicyclic compound having one ring only saturated is then separated from the reaction product mass containing predominantly such product by fractional distillation. The separated product can then be upgraded in purity by chromatography. The biphenyl and dipyridyl starting compounds herein are obtainable in commerce.

The invention will be more fully understood by reference to the following examples. Parts and percentages are by weight unless otherwise specified.

Example I

About 7.5 parts of biphenyl were mixed together with 25 parts by volume of either acetic acid or cyclohexane as solvent and hydrogenated at a temperature of 100° C. and a pressure of 1000 p.s.i.g. in the presence of a certain platinum group metal as catalyst as set forth hereinafter in Table I. A number of test runs were carried out employing the quantities of biphenyl and solvent stated supra and under substantially identical conditions of temperature and pressure. The following results were obtained:

TABLE I

| Test Run No. | Catalyst | Quantity of Catalyst (mg.) | Solvent | Hydrogenate Biphenyl (mole percent) | Phenylcyclohexane (mole percent) |
|---|---|---|---|---|---|
| 1A | 5% Pd/C | 600 | Acetic acid | 10 | 87 |
| 1B | 5% Pd/C | 600 | Cyclohexane | 3 | 97 |
| 2 | 5% Pt/C | 600 | Acetic acid | 100 | 0 |
| 3 | 5% Rh/C | 600 | Cyclohexane | 21 | 43 |
| 4A | 5% Rh/C | 600 | Acetic acid | 36 | 31 |
| 4B | 5% Ru/C | 600 | Cyclohexane | 35 | 34 |

As shown by Test Runs 1A and 1B of Table I the combination of the supported palladium as catalyst and the acetic acid and cyclohexane respectively as solvent resulted in a reaction product containing considerably greater quantities of phenylcyclohexane and predominantly phenylcyclohexane, whereas the supported rhodium and ruthenium catalysts of Test Runs 3, 4A and 4B respectively togther with the particular solvent specified for each run resulted in appreciably lower and a relatively minor amount of phenylcyclohexene in the product hydrogenate. In Test Run 2 employing a supported Pt catalyst and acetic acid as solvent, no hydrogenation occurred whatsoever.

Example II 2,2-dipyridyl in amount of 2 parts and mixed together with 25 parts by volume of cyclohexane was hydrogenated at a temperature of about 110° C. and a pressure of 1000 p.s.i.g. in the presence of about 600 mg. of a supported platinum group metal as catalyst. A number of runs were carried out under substantially identical reaction conditions of temperature and pressure and in the presence of either supported Pd, Pt or Rh as catalyst. The results are set forth in Table II which follows.

TABLE II

| Test Run No. | Catalyst | Percent in Hydrogenate Dipyridyl | Piperidylpyridine |
|---|---|---|---|
| 5 | 5% Pd/C | 43 | 51 |
| 6 | 5% Rh/C | 51 | 10 |
| 7 | 5% Pd/C | 11 | 60 |
| 8 | 5% Pt/C | | 0 |

The data of Table II and particularly of Test Runs 5 and 7 compared with the remaining test runs show that only with the supported palladium catalyst and the cyclohexane as solvent was a reaction product containing predominantly piperidylpyridine obtained. No hydrogenation occurred whatsoever when a supported platinum catalyst and cyclohexane was utilized in Test Run 8.

Example III

About 5–10 parts of biphenyl mixed together with about 20–25 parts by volume of glacial acetic acid as solvent was hydrogenated at a temperature of about 100° C.–118° C. and a pressure of 1000 p.s.i.g. in the presence of about 300 mg. of a supported platinum group metal as catalyst. A number of hydrogenation runs were carried out under similar reaction conditions of temperature and pressure and in the presence of either Ir, Pt, Ru or Pd as catalyst. The results of such runs are set forth in Table III hereafter.

TABLE III

| Test Run No. | Catalyst | Percent in Hydrogenate Biphenyl | Phenylcyclohexane |
|---|---|---|---|
| 9 | 15% Ir/C | 100 | 0 |
| 10 | 5% Pt/C | 100 | 0 |
| 11 | 5% Ru/C | 100 | 0 |
| 12 | 5% Pd/C | 10 | 87 |
| 13 | 5% Pd/C | 0 | 84 |

The Table III test data show that the combination of the palladium catalyst and glacial acetic acid solvent of Test Runs 12 and 13 resulted in a product hydrogenate containing a considerably greater amount of phenylcyclohexane than the remaining test runs, wherein other platinum group metals were employed as catalyst with the glacial acetic acid solvent. In Test Runs 9, 10 and 11 utilizing an Ir, Pt and Ru catalyst respectively, no hydrogenation of the biphenyl occurred whatsoever.

Example IV

Biphenyl in amount of about 10–20 parts mixed together with about 20–50 parts by volume of cyclohexane as solvent was hydrogenated at a temperature of 100° C. and a pressure of 1000 p.s.i.g. in the presence of about 600 mg. of a supported platinum group metal as catalyst. A number of hydrogenation runs were carried out under substantially identical temperature and pressure conditions in the presence of either Ru, Pt, Ir or Pd supported on carbon as catalyst. The results of such runs are given in Table IV which follows.

TABLE IV

| Test Run No. | Catalyst | Percent in Hydrogenate | |
|---|---|---|---|
| | | Biphenyl | Phenylcyclohexane |
| 14 | 5% Ru/C | 100 | 0 |
| 15 | 5% Ru/C | 35 | 34 |
| 16 | 5% Pt/C | 100 | 0 |
| 17 | 15% Ir/C | 40 | 37 |
| 18 | 5% Rh/C | 71 | 17 |
| 19 | 5% Pd/C | 0 | 91 |
| 20 | 5% Pd/C | 3 | 97 |

The test data of Table IV evidence that only the combination of the palladium catalyst and the cyclohexane as solvent (Test Runs 19 and 20) resulted in a high yield of phenylcyclohexane and a reaction product containing predominantly phenylcyclohexane.

The percentages of catalytic metals in the supported catalysts of the foregoing test runs are based on weight of total catalyst, i.e. platinum group metal plus carbon support.

What is claimed is:

1. A process for the selective hydrogenation of a compound having the formula

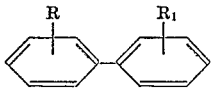

wherein R and $R_1$ are hydrogen or lower alkyl radicals, which comprises subjecting said compound in solvent comprising normally liquid paraffinic hydrocarbon having from 5–12 hydrocarbons per molecule or a saturated aliphatic hydrocarbon monocarboxylic acid having from 2–10 carbon atoms per molecule in the presence of a catalyst consisting of palladium supported on a solid catalytic carrier at a reaction temperature and pressure until sufficient hydrogen is taken up to saturate one aromatic ring of the compound, thereby obtaining a reaction product comprising predominantly a compound having the formula

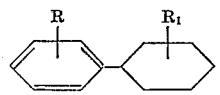

wherein R and $R_1$ are as defined as above.

2. The process of claim 1 wherein the reaction is carried out at a temperature in the range from about 50° C.–300° C. and a pressure in the range from about 50–5000 p.s.i.g.

3. The process of claim 1 wherein the solvent is cyclohexane.

4. The process of claim 1 wherein the solvent is acetic acid.

5. The process of claim 1 wherein the compound to be reacted is biphenyl and the product is phenylcyclohexane.

No references cited.

DELBERT E. GANTZ, *Primary Examiner.*

SAMUEL P. JONES, *Examiner.*